United States Patent
Rogers

[11] 3,774,988
[45] Nov. 27, 1973

[54] VARIABLE LIGHT-FILTERING DEVICE

[75] Inventor: Howard G. Rogers, Weston, Mass.

[73] Assignee: Polaroid Corporation, Cambridge, Mass.

[22] Filed: June 21, 1971

[21] Appl. No.: 155,112

Related U.S. Application Data

[62] Division of Ser. No. 854,522, Sept. 2, 1969, Pat. No. 3,652,149.

[52] U.S. Cl. ................... 350/150, 350/157, 350/160
[51] Int. Cl. .............................................. G02f 1/26
[58] Field of Search ................... 350/147, 150, 157, 350/160

[56] References Cited
UNITED STATES PATENTS

| | | | |
|---|---|---|---|
| 3,317,266 | 5/1967 | Heller et al. | 350/160 R |
| 3,215,038 | 11/1965 | Heller et al. | 350/160 R |
| 3,443,855 | 5/1969 | Land et al. | 350/150 |
| 3,560,075 | 2/1971 | Battista et al. | 350/147 |
| 3,653,741 | 4/1972 | Marks | 350/147 |

*Primary Examiner*—David Schonberg
*Assistant Examiner*—Michael J. Tokar
*Attorney*—Charles Mikulka et al.

[57] ABSTRACT

This invention relates to light filters employing redox compounds that are substantially light-transmitting in their oxidized state and capable of forming a stable colored free radical upon the addition of electrons. The colored free radical formed in response to the flow of electric current renders the device light-absorbing. To restore the original light-transmitting properties, the colored free radical may be readily re-oxidized, for example, by reversing the direction of current flow.

8 Claims, 11 Drawing Figures

INVENTOR.
HOWARD G. ROGERS

BY

Brown and Mikulka
ATTORNEYS

INVENTOR.
HOWARD G. ROGERS

BY

Brown and Mikulka
ATTORNEYS

VARIABLE LIGHT-FILTERING DEVICE

This application is a divisional of my copending U. S. Pat. application Ser. No. 854,522 filed Sept. 2, 1969, now U.S. Pat. No. 3,652,149.

This invention relates to light filters and similar devices employing a redox compound capable of forming a stable colored free radical upon the addition of electrons.

Various systems utilizing an electric current passing through an electrolytic solution to effect a change in the optical density or spectral absorption characteristics of a substance have heretofore been known in the art. One such system involves the alternate plating and unplating of metal at one of the electrodes. Another involves the use of an electrolytic solution of a reversible color-responsive material which changes color or becomes colored upon passing a current through the solution. Basically, these systems have in common a combination of elements, viz., a pair of electrodes separated by a suitable electrolyte, a source of current, and some material or materials which initially may be present in the electrolyte and which, upon impressing a suitable current, exhibit a change in optical density or spectral absorption characteristics, e.g., by plating out or color change from color to colorless or colorless to color.

Such systems generally suffer from at least one of the following shortcomings: too slow; unstable; non-reversible; not automatically or fully reversible; not uniform or consistent throughout the system, particularly over large areas.

It is therefore the primary object of the present invention to provide a novel system for controlling light transmission.

Another object of the present invention is to provide a variable light filter.

Still another object is to provide a variable density window.

Yet another object is to provide non-glare headlamp and windshield systems for vehicles.

Another object is to provide variable density light filter lenses to protect the eyes from brilliant light.

A further object is to provide novel systems for image recordation and image translation.

A still further object is to accomplish the foregoing objectives by providing a reversible system utilizing certain redox compounds whose spectral absorption characteristics are altered instantaneously and automatically upon the addition of electrons in response to the flow of current from a suitable source and restored upon reoxidation.

Other objects of the invention will in part be obvious and will in part appear hereinafter.

The invention accordingly comprises the process involving the several steps and the relation and order of one or more of such steps with respect to each of the others and the product possessing the features, properties and the relation of elements which are exemplified in the following detailed disclosure, and the scope of the application of which will be indicated in the claims.

It has now been discovered that systems capable of a rapid and uniform change in spectral absorption characteristics or optical density to control the transmission of light may be obtained by utilizing certain redox compounds, namely, redox compounds that are substantially light-transmitting in their oxidized state and capable of forming a stable colored free radical upon the addition of electrons whereby they become light-absorbing. By light-transmitting, it is meant that the compounds are substantially colorless or only faintly colored in their oxidized state so as to transmit substantially all visible light. Upon the addition of an electron, they form an intensely colored stable free radical so as to absorb a substantial portion of light in the visible range.

In contrast to prior electrochemical systems, in the present invention the aforementioned redox compounds may be used in the absence of an electrolyte, i.e., they may be used in the absence of an ionizable material such as an inorganic salt which, upon impressing an electric current, provides ions which will effect the desired change in spectral absorption characteristics. Since an electronic rather than an ionic reduction reaction is involved, the conversion to the free radical occurs very rapidly in response to the flow of current to provide a rapid change in optical density and spectral absorption characteristics. Moreover, the reaction is readily reversible by reoxidizing the free radical which may be accomplished by simply reversing the direction of flow of the electric current and/or by employing an oxidant which may be oxygen or a suitable oxidizing compound.

For a fuller understanding of the nature and objects of the invention, reference should be had to the following detailed description taken in conjunction with the accompanying drawings wherein.

Figure 1:
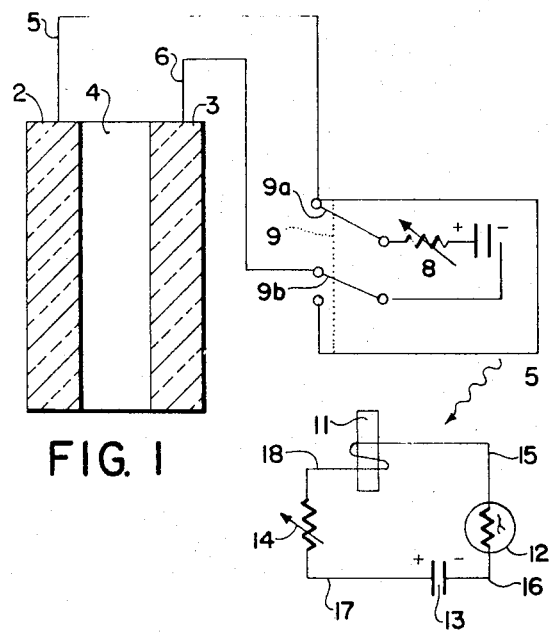
FIG. 1 is a diagrammatic sectional view illustrating one embodiment of this invention.

In carrying out the present invention, any redox compound may be used including either monomeric or polymeric compounds provided that it is substantially light-transmitting in its oxidized state and capable of forming a stable, colored free radical upon the addition of electrons and provided that it is capable of being alternately and repeatedly reduced to the free radical and reoxidized whereby a reversible change in spectral absorption characteristics or optical density is achieved. As discussed above, the redox compound may be substantially colorless in its oxidized state, or it may be faintly colored so as to be substantially transparent to visible light. Upon the addition of electrons, a stable free radical is formed which is deeply colored and light-absorbing in the visible range.

Examples of redox compounds meeting these criteria are compounds containing a strongly delocalized electron, i.e., compounds which have an odd number of π electrons distributed over an even number of atoms arranged in a chain. Such compounds are derived from the general formula $\ddot{X}-(Y=Y)_n-\ddot{X}$, wherein X is selected from a nitrogen, sulfur and oxygen atom; Y is selected from a nitrogen atom and CH; and $n$ is 0 or a positive integer. A discussion of the chemistry of these compounds is found in *International Union of Pure and Applied Chemistry*, Vol. 15 (1967) entitled, "International Symposium on Free Radicals in Solution," pages 109–122.

Redox compounds of this type which have been found especially useful in the present invention are the so-called Weitz radicals as described in the aforementioned reference wherein X is nitrogen and Y is CH, such as 4,4'-dipyridylium compounds, diazapyrenium compounds and pyrazidinium compounds. Typically, these compounds are substantially colorless to yellow in their oxidized state and upon the addition of an electron form a deeply colored free radical of intense blue to bluish-purple.

Illustrative of suitable 4,4'-dipyridylium compounds are those having the formula:

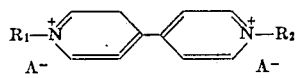

wherein $R_1$ and $R_2$ each are selected from hydrogen, alkyl, aralkyl and aryl and $A^-$ is an anion; and polymers thereof having the formula:

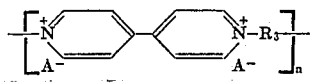

wherein $A^-$ is defined as above and $R_3$ is either alkylene having four to eight carbon atoms or xylylene and $n$ is at least 2.

Illustrative diazapyrenium compounds are those having the formula:

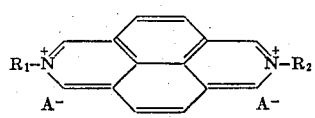

wherein $A^-$, $R_1$ and $R_2$ are defined as above. Illustrative pyrazindinium compounds are those having the formula:

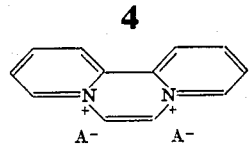

wherein $A^-$ is defined as above.

Typical of the alkyl, aralkyl and aryl substituents are methyl, ethyl, propyl, isopropyl, butyl, hexyl, benzyl, tolyl, p-ethylphenyl and phenyl. Typical anions include $Br^-$, $Cl^-$, $I^-$, $SO_4^-$, $ClO_4^-$, $BF_4^-$ and tosyl.

Specific compounds encompassed by the above formulae are N,N'-dimethyl-4,4'-dipyridylium dichloride; N,N'-diphenyl-4,4'-dipyridylium dichloride; N-ethyl-N'-phenyl-4,4'-dipyridylium dibromide; N,N'-dibenzyl-4,4'-dipyridylium diiodide; 2,2'-dimethyl-N,N'-diethyl-4,4'-dipyridylium dichloride; N,N'-dimethyl-2,7-diazapyrenium difluoroborate; N,N'-diphenyl-2,7-diazapyrenium difluoroborate; N,N'-dibenzyl-2,7-diazapyrenium dibromide; 4,5-dimethyl-N,N'-dimethyl-2,7-diazapyrenium dichloride; dipyrido-[1,2-α;2',1'-c]-pyrazidinium dibromide and 3,3'-dimethyldipyrido-[1,2-α; 2',1'-c]-pyrazidinium dichloride.

Illustrative of the polymeric 4,4'-dipyridylium compounds mentioned above are those prepared by reacting 4,4'-dipyridyl with an alkylating agent, e.g., 1,8-dibromooctane or 2,2'-dibromo-p-xylene, as described and claimed in copending application Ser. No. 854,781 of Myron Simon, filed on even date herewith, now U.S. Pat. No. 3,641,034.

Upon the an of the appropriate potential, the aforementioned redox compounds are readily converted to a deeply colored free radical, which is sufficiently stable so that the color once formed will remain over a substantial period of time without further application of electric current thereto. In applications where it is desirable to quickly restore the original light-transmitting properties of the compound, the free radical may be readily reoxidixed by reversing the direction of current flow and/or by using an oxidizing agent. For example, an electrically stable organic or inorganic electron donor, such as ceric ammonium nitrate or benzoquinone may be admixed with the redox compound. The oxidizing agent also may be atmospheric oxygen and the system suitably vented so that oxygen ions from the air can reoxidize the free radical to restore the original spectral absorption characteristics. Where an aqueous solution of redox compound is employed, the oxygen generated by electrolysis may be used to reoxidize the colored free radical provided that it does not proceed at a rate to cause excessive bubbling. To control electrolysis, other pathways for the current may be provided.

In the present invention the aforementioned redox compounds may be utilized in either a liquid or solid system. They may be dissolved in aqueous solution or in an electrically stable organic liquid, e.g., propylene glycol or ethylene glycol monomethyl ether, which additionally may contain viscosity imparting reagents, such as carboxymethyl cellulose. They may be dispersed in a compatible gel, such as gelatin, hydrolyzed polyisopropenyl acetate or hydroxyethyl cellulose, or they may be dispersed in a compatible polymeric matrix, e.g., polyvinyl acetate, polystyrene, cellulose acetate or polymethyl methacrylate. It will be understood that the liquid or solid used to dissolve or disperse the compounds will be substantially colorless so as not to interfere with the light transmitting properties of the system. Also, the redox compounds themselves may be used as their own matrix and the solid redox material simply compressed between the electrodes. In systems where it is desirable to achieve the greatest possible speed in reversibly altering optical density or spectral absorption characteristics, the redox compound is used in high concentrations and preferably is used undiluted, i.e., by itself.

In a preferred embodiment, a solid system is employed which comprises a film of polymeric redox compound made by casting a solution of the redox polymer onto a glass plate electrode. If a polarizing material is desired, the cast film may be stroked in a given direction until oriented.

As indicated previously, the redox compounds of the present invention may be employed without an electrolyte. Sodium chloride, copper perchlorate, acid zinc sulfate, lead nitrate, hydrochloric acid and other ionizable substances commonly used to provide ions to effect color change are not essential to the operation of the systems of the present invention. The redox compounds will function as their own electrolyte and will exhibit a change in optical density or spectral absorption characteristics in response to an electronic reaction. If desired, however, the redox compounds may be used in an ionic system, i.e., a conventional electrolytic system employing the aforementioned ionizable substances.

One electrolytic system which has proved especially valuable comprises a saturated solution of a 4,4'-dipyridylium compound in aqueous acid solution. Using about one-tenth to one-third of the total volume of hydrochloric acid with N,N'-dimethyl-4,4'-dipyridylium dichloride, an optical density of 3 may be achieved in about 150 microseconds by applying a potential of 500 volts. Besides hydrochloric acid, other organic or inorganic acids may be used as the electrolyte, such as acetic acid, citric acid, sulfuric acid, and nitric acid. Where rapid clearing of the system to its light-transmitting characteristics is desired, an oxidizing agent, e.g., ceric ammonium nitrate may be incorporated into the electrolytic solution. An electrically responsive light-absorbing element utilizing this and other electrochemical systems is described and claimed in application Ser. No. 880,796 by John A. Hall, Jr. and John J. McCann filed Nov. 28, 1969, now U.S. Pat. No. 3,692,388.

It will be appreciated that the aforementioned compounds will exhibit different spectral absorption characteristics at the anode than they will at the cathode. Oxidation reactions will occur and the pH will be acidic at the anode while reduction reactions will occur and the pH will be basic at the cathode. Thus, when the compound is positioned adjacent one of the electrodes, the flow of current is controlled so that this electrode may be either the anode or the cathode and the spectral absorption characteristics of the compound will be determined by the direction of the flow of current.

It will be understood that the above-described redox compounds may be used in conjunction with other oxidation-reduction indicators which require the presence of an ionizable material to provide ions for effecting color change. As is well known in the art, all oxidation-reduction indicators change color at a set electrical potential. Thus, the D.C. potential necessary to obtain the desired spectral absorption or optical density change will depend upon the potential required for the particular compound employed and will depend in part on the conductivity of the system and cell geometry. It will be apparent to those skilled in the art that the total voltage required for a given compound and a given arrangement of elements may be ascertained by reference to the values for electrical potential given in the literature together with routine experimentation. For greatest efficiency, the set electrical potential of the above-described redox compounds and conventional oxidation-reduction indicators used should be fairly similar.

The set electrical potential for various oxidation reduction indicators are set forth in the following table wherein the standard value is given when the dye is half oxidized and half reduced.

TABLE

| Indicator | $P_o$ at pH$^o$= 0 20° C. | Color Change Oxidized | Reduced |
|---|---|---|---|
| Safranine T | 0.24 | Blue-violet | Colorless |
| Neutral Red | 0.24 | Red-violet | " |
| Indigo monosulfonic acid | 0.26 | Blue | " |
| Phenosafranine | 0.28 | " | " |
| Indigo tetrasulfonic acid | 0.36 | " | " |
| Nile Blue | 0.41 | " | " |
| Methylene Blue | 0.53 | " | " |
| 1-naphthol-2-sodium sulfonate-indophenol | 0.54 | Red | " |
| Phenol-indo-2,6-dibromo-indophenol | 0.67 | " | " |
| Bindschedler's Green | 0.68 | Green | " |
| Diphenylamine | 0.76 | Violet | " |
| Diphenylamine-p-sulfonic acid | 0.84 | Red-violet | " |
| Erioglaucine A | 1.00 | Green | Blue-red |
| Setoglaucine 0 | 1.01 | Yellow | Yellow-red |
| p-nitrodiphenylamine | 1.05 | Red-violet | Colorless |
| Diphenylamine-2,3'-dicarboxylic acid | 1.12 | Violet | Green |
| Diphenylamine-2,2'-dicarboxylic acid | 1.26 | Blue | Green |

For a listing of additional oxidation-reduction indicators and acid-base indicators which may be used in conjunction with the redox compounds of the present invention, reference is made to Chemical Indicators, O. Tomicek, Butterworths Scientific Publication, 1951.

The use of the above compounds in the practice of this invention will be more readily understood by reference to the drawings.

As shown in FIG. 1, the light filter or light transmission controlling means designated at 1 comprises a pair of spaced, parallel electrodes 2 and 3 which are light-transmitting and a substantially light-transmitting redox compound as described above or a mixture of such compounds 4 confined between and in contact with the electrodes. As discussed previously, where it is desired to rapidly clear the system to restore its original light-transmitting properties subsequent to forming the colored free radical, the direction of current flow may be reversed and/or an oxidizing compound may be used in conjunction with the redox compound. Rather than mixing an oxidizing agent with the redox compound, the device may be vented, in any suitable manner to allow oxygen ions from the atmosphere to reoxidize the free radical. Where an aqueous solution of the compound is used, the oxygen resulting from hydrolysis may be employed to clear the system. Depending upon the end use of the filter and the rate at which it is desired to clear the system, current reversal and/or one or more oxidizing agents may be used.

The electrodes 2 and 3 are at least translucent and preferably are substantially transparent to light. They may be any of the light-transmitting electrodes heretofore known in the art, e.g., transparent bases of plastic or glass supporting a thin coating of a conducting metal such as gold, fine mesh screens of a noble metal which may be carried on a transparent support and glass coated with a transparent film of an oxide, such as cadmium, indium or tin oxide. Where the electrodes comprise transparent bases having an electrically conductive surface, they may be used to form opposed end walls of the filter device, provided they are structurally adequate. Alternatively, a separate container may be used to enclose the system.

Electrodes 2 and 3 are connected to a suitable source of electric current by leads 5 and 6, respectively. As shown in FIG. 1, the source of current may comprise a battery 7. Resistor 8 is preferably but not necessarily provided in order to regulate the amount of current. The terminal ends of leads 5 and 6 make contact with double switch 9 to complete the circuit.

In operation, when the switch is in the "up" position, as shown in FIG. 1, the current is caused to flow from the battery through switch 9a to lead 5 whereby electrode 2 becomes the anode and electrode 3 becomes the cathode. Switch 9b of course makes contact with lead 6 to complete the circuit. Thus, electrode 2 permits oxidation reactions and electrode 3 permits reduction reactions. That layer of redox compound adjacent the cathode, i.e., electrode 3 is converted to a colored free radical so that a colored filter is obtained.

Where the device is to be cleared by reversing the current flow the direction of current may be controlled manually or it may be controlled automatically, e.g., by means such as illustrated in the bottom portion of FIG. 1. As is shown, this automatic means may comprise a solenoid 11, photoconductive cell 12, battery or other source of current 13 and a resistor 14 connected in series by means of leads 15, 16, 17 and 18, respectively.

As is well known in the art, cell 12 and resistor 14 cooperate to control the amount of current flowing to solenoid 11. When the current is of a predetermined amount, e.g., when photoconductive cell 12 records a relatively low intensity of light, solenoid 11 causes switch 9 to drop to the "down" position, thereby reversing the direction of the flow of current.

By way of illustration, in a system employing conductive glass electrodes and a dipyridylium compound as the redox material, a change of color from yellow to blue occurs in the vicinity of electrode 3 (cathode) when the switch is in the "up" position. Upon reversing the current flow, the original yellowish color is restored to the deeply colored layer adjacent electrode 3, which upon current reversal becomes the anode.

In clearing the device by current reversal it has been found that the best results are achieved by using a slightly lower potential for reoxidizing the colored free radical than the potential needed for the reduction reaction. To reduce a given redox compound to its colored free radical, a certain minimum voltage is required depending upon the set electrical potential of the compound and upon the cell used, i.e., the geometry, the particular electrodes employed, etc. While the colored free radical formed may be reoxidized simply by reversing the direction of current flow and applying the same potential, a colored layer of redox compound tends to form adjacent the opposite electrode which becomes the cathode upon switching the polarity of the system. The formation of color at the opposite electrode may be prevented and the cell visibly cleared by applying a voltage slightly below, e.g., about 0.1 volt below the minimum needed for the reduction reaction. It will be appreciated that the speed with which the compound is reduced to its colored form is in large measure dependent upon the potential applied. Thus, for achieving very rapid color formation, the voltage applied is considerably above the minimum.

In the filtering device described above, only the aforementioned redox compounds are employed. It is also within the scope of the invention to use the aforementioned redox compounds adjacent one of the electrodes and another compound such as a pH or acid-base indicator adjacent the other electrode.

Figure 2:
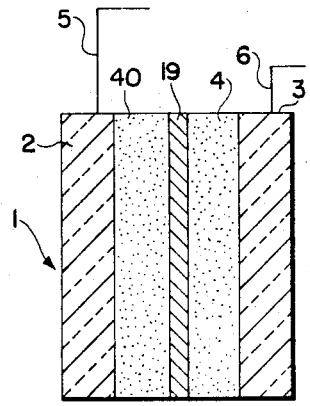
FIG. 2 is a similar view illustrating another embodiment of the invention.

Such a filtering device is illustrated in FIG. 2 wherein a redox compound 4, such as a 4,4'-dipyridylium compound, is adjacent electrode 3 and another material having reversibly alterable spectral absorption characteristics 40 is adjacent electrode 2. Materials 4 and 40 are separated by a light-transmitting selectively permeable membrane 19, such as cellophane, which prevents migration and admixing of the materials 4 and 40 while permitting the flow of current. The membrane may be eliminated in solid systems where materials 4 and 40 are in a gel or other non-liquid form.

Material 40 may comprise a compound whose spectral absorption characteristics are determined by the pH of the environment, e.g., so-called pH or acid-base indicators. Illustrative of such compounds are phenolphthalein which changes from colorless in an acid medium to pink in a basic medium; Malachite Green which changes from green to colorless; Phenacetolin which changes from red to colorless; bromocresol green which changes from yellow to blue; etc.

Another class of compounds useful as material 40 are those which are capable of being alternatively or reversibly reduced and re-oxidized and which exhibit spectral absorption characteristics in the reduced state different from those exhibited in the oxidized state. Examples of such compounds are leuco dyes which typically are colorless in the reduced state and colored in the oxidized state and oxidation-reduction indicators such as Phenosafranine which changes from blue in an oxidizing environment to colorless in a reducing environment; Indigo tetrasulfonate which changes from blue to colorless; diphenylamine which changes from violet to colorless; Erioglaucin A which changes from green to red, etc.

Other compounds useful as material 40 are polymers which exhibit different spectral absorption characteristics in an acidic versus an alkaline environment. Examples of such polymers are 5-nitrosalicylaldehyde partial acetal of polyvinyl alcohol which changes from colorless to yellow in basic medium; 3'-formylphenolphthalein partial acetal of polyvinyl alcohol which changes from colorless to red in basic medium; etc.

It will be appreciated that material 40 may be dissolved in a solution or dispersed in a gel containing any of the common electrolytes. Also, material 40 may possess or be capable of possessing the same or different spectral absorption characteristics, e.g., the same color or a color different from material 4.

Using two separate materials in this manner allows more efficient utilization of a given voltage than is possible with a filtering device as illustrated in FIG. 1. For example, a blue filter, i.e., one which is either blue or substantially transparent, depending on the flow of current may be obtained using a 4,4'-dipyridylium compound, such as N,N'-dimethyl-4,4'-dipyridylium (methyl viologen) as material 4 and the oxidation-reduction indicator 2,6-dibromophenyl indophenol as material 40.

Methyl viologen is substantially colorless to faintly yellow 2 its oxidized state and an intense bluish color when reduced. Conversely, the indophenol is blue in its oxidized state and substantially colorless when reduced. Thus, when current is impressed so that electrode 2 is the anode and electrode 3 is the cathode, both materials 4 and 40 become blue to provide a blue filter, the light transmission characteristics of which are a function of both materials. When the current flow is reversed so that electrode 2 is the cathode and electrode 3 is the anode, the device 1 becomes substantially light-transmitting.

Rather than using the indophenol oxidation-reduction indicator, one may use a pH indicator such as the disodium salt of 5,5'-indigodisulfonic acid, which will be blue in an acidic environment as when electrode 2 is the anode and substantially colorless in a basic environment as when electrode 2 becomes the cathode upon reversal of the current flow. Also, it will be appreciated that where materials 4 and 40 are in a solid form that the membrane 19 is not essential. If desired, material 4 may contain an oxidizing agent.

In the filtering devices previously described, the electrodes are shown to be in parallel relationship with one another. In lieu of this arragnement, the electrodes may be positioned in different relationship with one another and/or may have different shapes. For example, the electrodes may be perpendicular to one another; or one electrode may be coiled around the other electrode. A gross electrode comprising a flat, rectangular light-transmitting electrically conducting plate may be used with a minor electrode comprising a circular or U-shaped rod or wire positioned outside of the useful optical path of the device. In such variations, suitable transparent means may be employed to confine the light-filtering compound.

In the embodiments heretofore described, a pair of electrodes have been employed. However, it is within the scope of this invention to provide variable filters employing more than two electrodes.

Figure 3:
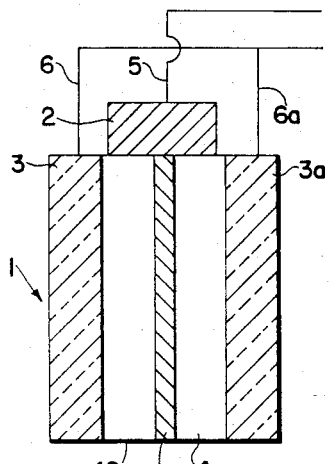
FIG. 3 is a similar view illustrating yet another embodiment of the invention.

In FIG. 3, there is shown a variable filter having three electrodes, two of the electrodes being in parallel relationship with one another, the third being substantially perpendicular to the first two electrodes and outside the field of light-transmittancy of the filter but in contact with the light filtering materials 4 and 40.

As in the embodiment illustrated in FIG. 1, leads 5 and 6 are connected to a suitable source of current. Lead 6a connects electrode 3a to lead 6, so that electrodes 3 and 3a will be of the same potential when current is impressed. Electrode 2, which need not be transparent as it lies beyond the field of light-transmittancy of the filter, is connected by means of lead 5 to the current source.

In one embodiment, materials 4 and 40 are identical in their spectral absorption characteristics so as to provide a variable filter similar in some respects to the filter of FIG. 2. For example, bromothymol blue which is blue in a basic environment and yellowish in an acid environment may be employed as material 40 with methyl viologen as material 4 which is blue in its reduced form and colorless to faintly yellow in its oxidized form. When current is impressed in one direction, both electrodes 3 and 3a are cathodes so that materials 4 and 40 are blue. When the direction of current flow is reversed both electrodes 3 and 3a become anodes, so that both materials 4 and 40 become substantially transparent.

By means of suitable wiring, switches and the like (not shown), either of electrodes 3 and 3a may be disconnected, so that current may be caused to flow to only one of the electrodes 3 and 3a. Thus, it is possible to provide a filter of varying density merely by connecting or disconnecting one of the electrodes. For example, if lead 6a is disconnected, the filtering ability of the system will be a function only of the density of the filter produced at electrode 3. By reconnecting lead 6a, the density is increased due to the light absorption now provided at electrode 3a. Obviously, the connecting and disconnecting may be controlled either manually or automatically.

Where materials 4 and 40 are different, e.g., when they are substantially colorless in one environment and exhibit different spectral absorption characteristics in another environment, three different colored filters may be obtained. Where both electrodes 3 and 3a are connected so that materials 4 and 40 exhibit a color, the resulting filter will be a product of the absorption characteristics of both materials. Alternatively, either electrode may be disconnected to provide a filter of the absorptive characteristics of the color-providing material associated with the respective electrodes 3 and 3a.

It is also contemplated that both the materials 4 and 40 may be the same or different redox compounds of the present invention, e.g., a 4,4'-dipyridylium and/or diazapyrenium compound described above. Alternatively, a redox compound, e.g., a 4,4'-dipyridylium compound, may be used as material 4 in this arrangement without another color-changing material 40. When both materials 4 and 40 are used and are in a gel or other solid form, membrane 19 may be eliminated.

As mentioned previously, in a preferred embodiment of the present invention, the light-filtering redox compound is preferably a polymeric compound, such as, the 4,4'-dipyridylium polymers described above. Polymer films of this type, including molecularly oriented polymer films may be used as materials 4 and 40 in the filtering device of FIG. 3. When oriented films are employed, they may be positioned with their axes of polarization at a predetermined desired angle, for example, at right angles for potential total extinction of light. When current is impressed so that electrodes 3 and 3a are cathodes, a pair of deeply colored blue light polarizers are formed having their axes, for example, at right angles thereby permitting a minimal amount of light to be transmitted through the filtering device. When the current flows in the opposite direction, the oriented films lose their polarizing properties with respect to visible light, and the films change from blue to their original yellowish color. By employing suitable wiring the variable filter of FIG. 3 is capable of providing a pair of polarizers or a single polarizer at either of the electrodes 3 or 3a.

Figure 4:
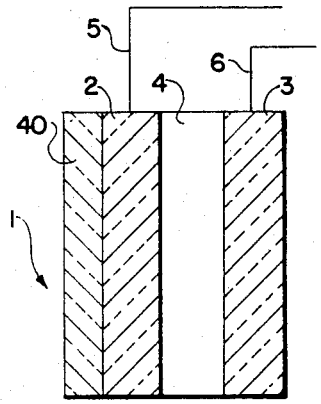
FIG. 4 is a similar view illustrating still another embodiment of the invention.

Another embodiment comprising a polarizing system is illustrated in FIG. 4 wherein a permanent polarizer 40 is provided on the side of electrode 2 opposite an oriented dipyridylium polymer film 4. Polarizer 40 also may be placed on the other side of the electrode 2 provided that it will allow the passage of current and is electrically stable. The permanent light-polarizing sheet 40 may also be positioned on the outer surface of electrode 3. As in the above embodiment, the layer of polymeric material 4 adjacent electrode 3 forms a blue light polarizing film upon the addition of electrons and upon reoxidation reverts to its original yellowish color. Reoxidation may be achieved by using an oxidizing agent and/or by reversing the direction of current flow.

In view of the foregoing illustrative embodiments, other variations in the structure and/or the arrangement of elements of the novel filtering device of this invention will be readily suggested to those skilled in the art.

Figure 5:
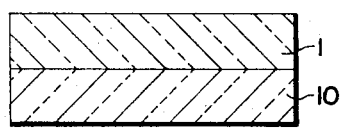
FIG. 5 is a cross sectional view of a lens element prepared in accordance with the present invention.

The light-filtering devices of this invention are capable of a variety of different uses in which a stable, uniform instantaneously variable light filter is desirable or necessary. They may be employed, for example, in lens elements for goggles or shields for protecting the eyes from bright light. A typical lens element is shown in FIG. 5.

As shown therein, the element comprises a transparent lens 10 having opposed faces and the novel filtering device 1 as shown, for example, in FIG. 1 in juxtaposition with and coextensive with one face of the lens. The filter 1 is connected by leads (not shown) to a suitable source of current. The filter 1 may be bonded to the lens 10 using any suitable light-transmitting adhesive, e.g., an epoxy resin.

It will be appreciated that a single such lens element may be used as an overall shield or two such elements may be used to protect the eyes and the element (s) mounted and cemented in a suitable frame provided with openings to accommodate the leads for connecting the filter element to a source of current.

Figure 6:
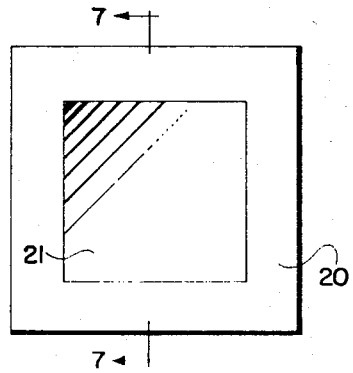
FIG. 6 is a plan view illustrating a variable density window prepared in accordance with the present invention.
Figure 7:
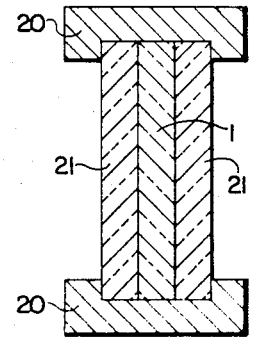
FIG. 7 is a partially schematic vertical sectional view taken along lines 7—7 of FIG. 6.

The novel filters of the present invention also find utility in variable density windows for controlling the amount of light entering a room or other enclosure. A typical variable density window is illustrated in FIGS. 6 and 7.

As shown therein, the variable density window comprises a recessed or grooved frame or mount 20 of a suitable non-conductive material such as wood confining the novel filtering device 1 as shown, for example, in FIG. 2 between a pair of transparent non-conducting plates 21. The filter 1 is connected to a suitable source of current by leads (not shown) passing through frame 20.

Where found expedient or desirable to do so, filter 1 and plates 21 may be laminated together at the top and bottom by means of a suitable bonding material to provide a unitary structure. Suitable bonding materials such as epoxy resins, vinyl acetate resins, etc. will be readily suggested to those skilled in the art. It is also contemplated that a polarizing filtering device may be used, such as shown in FIG. 3, wherein materials 4 and 40 comprise a molecularly oriented 4,4'-dipyridylium polymer film. Also, a pair of polarizing or non-polarizing filtering devices, each with its own protective plate or plates, may be provided on either side of frame 20 in which event the two devices may have an air space therebetween.

In controlling the amount of light entering a room or other enclosure, a maximum amount of current may be generated to provide a variable filter with maximum light absorption characteristics in response to maximum brightness. Conversely, in minimal brightness the flow of current may be automatically reversed to render the filtering device instantaneously light transmittant. Rather than reversing the current, reoxidizing to clear the system may be accomplished by chemical means using an oxidizing agent. For example, the system may be suitably ventilated to allow the redox material to be reoxidized in air.

The present invention is also useful in systems for providing non-glare and fog-penetrating headlamps for vehicles. It is contemplated that the present invention may be employed in automobiles and the like where the headlamps may be instantaneously rendered non-dazzling and/or fog-penetrating by applying an electric current in a given direction. When the direction of flow of current is reversed, the headlamp permits light to pass in much the usual way. The vehicle battery may be employed as the source of current and the direction of current flow may be controlled either manually by the occupant or automatically by a photoelectric cell or the like adapted in the manner illustrated in FIG. 1, to reverse the flow of current when motivated by the light from an oncoming vehicle.

Figure 8:
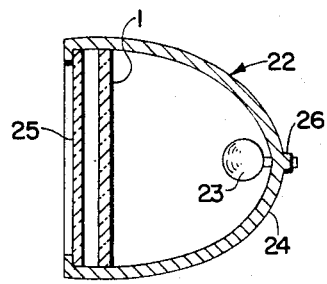
FIG. 8 is a somewhat schematic sectional view showing the use of the present invention in vehicle headlamps.

FIG. 8 illustrates somewhat schematically a headlamp of this invention. As shown therein, a typical headlamp 22 has a light bulb 23, a reflector 24 and a transparent protective cover 25 of glass or the like. The variable light filter 1, such as shown in FIG. 1, is positioned at some point between bulb 23 and cover 25 and mounted in a frame 26 or the like. Frame 26 is provided with a suitable opening through which leads 5 and 6 are connected to a suitable external source of current, e.g., the vehicle battery, although the headlamp assembly may be provided with its own source of current if desired. Also, it will be appreciated that the device 1 need not be behind the cover 25 nor that cover 25 is essential but that the arrangement shown affords protection for the assembly.

In use, the headlamp is normally substantially similar to conventional headlamps in terms of the transmittance of light emitted from bulb 23. In other words, with a variable filter such as illustrated in FIG. 1, the redox material 4 is substantially transparent until the current is caused to flow through lead 5 to electrode 2 so that electrode 3 becomes the cathode and material 4 becomes colored to render the light transmitted non-dazzling. When oriented polymer films are employed, the material 4 is light-polarizing upon changing color. Upon reversal of the flow of current, material 4 once more becomes substantially light-transmitting and non-polarizing to visible light so that light emitted from bulb 23 is again transmitted in much the conventional manner.

The present invention is also particularly useful in polarizing systems for providing glare-free windshields. Systems employing polarizing windshields to protect the occupants of a vehicle from the glare of oncoming headlights are well known in the art and are disclosed, for example, in U. S. Pat. Nos. 2,031,045; 2,087,795; and 2,440,133.

Essentially such systems employ a polarizer in the windshield and a polarizer in the headlamps, each having the same axis of polarization forming approximately a 45° angle with the vertical.

With two vehicles equipped in this manner approaching from opposite directions, the headlamp polarizer of one vehicle would have its axis of polarization perpendicular to that of the windshield polarizer of the second vehicle.

In this case, the light from one's own headlamps would be visible through the windshield, while the glare from oncoming headlights would be eliminated. However, a windshield provided with a polarizer in the manner heretofore known in the art has the inherent disadvantage of tending to obscure vision in certain instances by decreasing the intensity of transmitted radiation at times when the maximum intensity of transmitted radiation is desirable.

The present invention obviates this inherent disadvantage by providing a system whereby a normally transparent windshield may be rendered light-polarizing only at desired intervals, e.g., when it is desirable to prevent glare from oncoming headlights.

Figure 9:
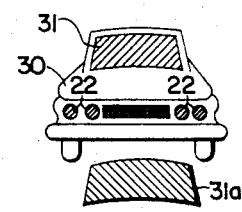
FIG. 9 is a partly perspective, partly schematic view illustrating the use of this invention to provide glare-free windshields.

FIG. 9 illustrates the use of this invention in antiglare systems for vehicles.

A vehicle 30 has its windshield 31 provided with a filter device such as illustrated in FIG. 1 having a molecularly oriented film of a redox compound, e.g., a 4,4'-dipyridylium polymer, capable of exhibiting light polarizing properties when current is impressed in a given direction actuated automatically by the intensity of light emanating from the headlights of an oncoming vehicle. The headlamps 22 also are provided with polarizing units which may be the conventional polarizers heretofore suggested for such usage. The polarizing units also may comprise the reversible polarizing systems of the present invention. The axes of polarization of the respective polarizers are the same and are approximately at a 45° angle to the vertical as shown by the diagonal lines.

The windshield 31a of a second vehicle equipped in similar manner would have a variable filter having an axis of polarization (viewed from within) as shown by the diagonal lines. In other words, the axis of polarization of the windshield of one vehicle will have an axis of polarization perpendicular to that of the headlamps (and windshield) of a second vehicle approaching from the opposite direction.

In the manner heretofore described, the light emanating from the approaching headlamps and striking the photoconductive cell of the filtering device would automatically and instantaneously cause the redox material in the light filter in the windshield element to become deeply colored and light polarizing and thus, eliminate glare from the oncoming vehicle. When the vehicle has passed, the process is automatically and instantaneously reversed whereby the redox material returns to its original light-transmitting condition.

It is also contemplated that the variable filter device associated with the windshield may also contain at least a second layer of redox material capable of providing a polarizer with its axis of polarization vertical, so as also to reduce glare from sunlight reflected off the road surface. In such a system, the variable filters of FIGS. 2–4 are particularly useful. It will be understood that the non-polarizing systems of the present invention also may be used to provide non-glare auto vehicle systems.

The present invention is also useful in photo-graphic processes for image formation or translation, particularly in the field of document duplication.

Figure 10:
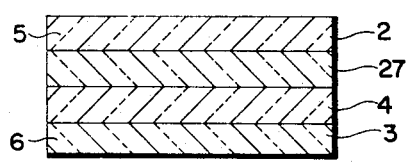
FIG. 10 is a partially diagrammatic, partially sectional view illustrating the use of the present invention in elements for preparing visible images.
Figure 11:
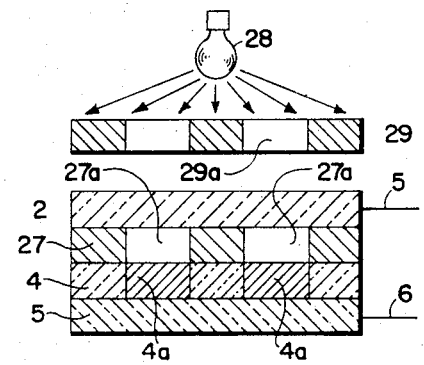
FIG. 11 is a similar view showing the preparation of a visible image with the element of FIG. 10.

FIGS. 10 and 11 illustrate this aspect of the present invention. As shown in FIG. 10, a photographic unit of this invention may comprise, in order, a first transparent electrode 2, a photoconductive layer 27, a redox material 4, such as the 4,4'-dipyridylium compounds described above, and a second electrode 3.

Photoconductive layer 27 comprises a layer of a photoconductive material, e.g., a material which is rendered electrically conductive in its transverse direction only upon exposure to light. Materials having this characteristic and their preparation are well known in the art and per se comprise no part of the present invention. Examples of such materials include cadmium sulfide, selenium, etc.

In FIG. 11 which illustrates the use of the photographic unit of FIG. 10, a document or other object 29 to be reproduced having transparent areas 29a is placed between a suitable source of light 28 and the photographic unit. Light passing through areas 29a render corresponding areas 27a of photoconductive layer 27 electrically conductive. This imagewise conductivity is employed to provide a visible image in the following manner.

When electric current is impressed, an imagewise change in the spectral absorption characteristics occurs in areas 4a of redox material 4. Material 4 is initially light-transmitting so that areas 4a become colored upon impressing the current to provide a negative image. Subsequent to image formation, the current either may be left on or switched off and the resulting image viewed by reflection through transparent electrode 3.

Where material 4 is a molecularly oriented redox polymer as described above, a polarizing image is obtained. When the polarizing image prepared in this manner is of such low contrast as to be faint, it may be viewed through a polarizer or analyzer, the polarizing axis of which is crossed with that of the polarizing surface on which the image is formed. In a known manner stereoscopic images also may be formed by superimposing a pair of polarizing images with the polarizing axis of one at right angles with the polarizing axis of the other. Where the polarizing images are of high contrast, they are particularly useful in advertising displays and the like which rely for appeal on unusual optical effects.

Various changes may be made in the structure of the photographic unit of FIG. 10 without departing from the scope of the invention. For example, it is contemplated that a metal layer could be placed on the back of the photoconductive layer to facilitate viewing of the image by reflection. Also, a light-absorbing element could be placed between the layer of redox material 4, and the photoconductive layer 27 to prevent unwanted changes in conductivity of layer 27 resulting from viewing light entering the back of the photographic unit through electrode 3.

The images prepared in the foregoing manner may be "erased" by subjecting photoconductive layer 27 to an overall exposure and continuing the flow of current in the same direction. The overall exposure will render photo-conductive layer 27 uniformly conductive which in turn causes a uniform change in spectral absorption characteristics of redox material 4. The colored material may be reoxidized to its colorless form by exposure to atmospheric oxygen or by using an oxidizing compound in admixture with the redox material. Alternatively, the original light-transmitting properties of the redox compound may be restored by simply reversing the direction of current flow.

Once the image has been "erased," a new image may be formed and the unit used repeatedly. Also, the images produced may be permanently recorded using conventional or diffusion transfer photographic techniques before they are erased.

In the foregoing description of the many uses of the novel filters of this invention, a single such filter has been employed. It is contemplated that a plurality of such filters may be employed, if desired. For example, two or more filters may be connected in series to provide increased filtering capabilities.

The following examples are given to further illustrate the present invention and are not intended to limit the scope thereof.

EXAMPLE 1

A light-filtering cell was constructed by cementing along three edges a pair of spaced, parallel rectangular conductive glass electrodes. The light-transmitting conducting tin oxide coatings of the electrodes were positioned so as to face each other, and the electrodes were connected to a source of D.C. current. The space between the electrodes was filled with a saturated solution of N,N'-dimethyl-2,7-diazapyrenium difluoroborate in water. The solution was light orange in color and after applying a potential of 3 volts D.C. across the cell, the layer of solution in the vicinity of the cathode turned green. The application of current was discontinued and the solution allowed to clear to its original orange color upon exposure to atmospheric oxygen.

EXAMPLE 2

Using the apparatus of Example 1, the cell was filled with a saturated solution of dipyrido[1,2-α;2',1',-c]—pyrazidinium dibromide in water. The solution was pale yellow in color and upon applying a potential of 3 volts D.C. across the cell, the solution in the vicinity of the cathode turned yellow-brown. After discontinuing current flow, the solution cleared to its original pale color upon exposure to atmospheric oxygen.

EXAMPLE 3

Example 1 was repeated using a saturated solution of N,N'-dimethyl-4,4'-dipyridylium dichloride which was faintly yellow in color. Upon applying a potential in excess of 2.3 volts across the cell, the solution adjacent the cathode became an intense bluish-purple. After discontinuing current flow, the solution returned to its original yellowish color upon standing in air.

N,N'-dimethyl-4,4'-dipyridylium disulfonate, when tested in the same manner, gave the same results of forming a deep blue color in the vicinity of the cathode and clearing to yellow after the flow of current was discontinued.

EXAMPLE 4

Example 3 was EXAMPLE using N,N'-dimethyl-4,4'-dipyridylium dichloride except that a potential in excess of 2.3 volts D.C. was applied in one direction across the cell whereupon the layer of solution adjacent the cathode turned from yellow to a deep blue-purple, and then the direction of current flow was reversed and a lower potential of 2.1 volts applied whereupon the solution cleared to its original yellow color.

EXAMPLE 5

Example 1 was repeated except that a saturated solution of N,N'-dibenzyl-4,4'-dipyridylium dichloride in water was employed. The solution turned a deep blue in the vicinity of the cathode when a potential of 3 volts D.C. was applied across the cell. The flow of current was discontinued and the solution allowed to stand in air whereupon it cleared to its original yellow color.

EXAMPLE 6

Example 1 was repeated except that a saturated solution of N,N'-dimethyl-4,4'-dipyridylium dichloride in ethylene glycol monomethyl ether was employed in the cell. The solution changed from yellow solution deep bluish-purple adjacent the cathode when a potential of 2.5 volts D.C. was applied. The solution cleared to its original EXAMPLE color upon standing in air after current flow was discontinued.

EXAMPLE 7

Example 1 was repeated except that the cell was filled with a saturated solution of N,N'-dimethyl-4,4'-dipyridylium dichloride in aqueous hydrochloric acid electrolyte which contained 0.2 cc. of a saturated aqueous solution of ceric ammonium nitrate per 16 cc. of electrolyte. The electrolyte contained 50 percent by volume acid.

Upon applying a potential of 2.3 volts D.C. across the cell, the solution adjacent the cathode turned an intense blue-purple. Substantially simultaneously with discontinuing current flow, the solution cleared to its original yellow color.

EXAMPLE 8

A layer of dry poly-N,n-butylene-4,4'-dipyridylium dibromide was compressed between a pair of transparent conductive glass electrodes having their conductive tin oxide coatings facing inwardly and contiguous with the opposed surfaces of the polymer layer. The electrodes were connected to a source of D.C. current and a potential in excess of 1.5 volts was applied across the cell. Upon applying the current, the layer of polymer adjacent the cathode changed from pale yellow to an intense bluish-purple. After the flow of current was discontinued, the polymeric layer cleared to its original yellow color upon exposure to atmospheric oxygen.

The poly-N,n-butylene-4,4'-dipyridylium dibromide,

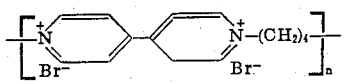

used in the above assembly was prepared as follows. A solution of 3.9 gm. 4,4'-dipyridyl and 5.4 gm. of 1,4-dibromobutane in 175 ml. of dry 2-methoxy ethanol was refluxed and stirred under nitrogen for 5 hours. The precipitated product was filtered off while hot, washed with 2-methoxy ethanol and then acetone. The product was dried in vacuo. Product yield was 2.5 gm.

EXAMPLE 9

The polymer prepared in Example 8 was spread on the conductive tin oxide surface of a conductive glass plate electrode and stroked in one direction with polished wood until it was clear. A second transparent conductive glass electrode was positioned on the film with its conductive surface contiguous therewith. After the electrodes were connected to a source of D.C. current, a potential in excess of 1.5 volts was applied across the cell whereupon the film at the interface with the cathode changed from yellow to an intense bluish-purple and exhibited light-polarizing properties. After current flow was discontinued, the film cleared to its original color and lost its polarizing properties with respect to visible light upon exposure to atmospheric oxygen.

EXAMPLE 10

The polymer prepared in Example 8 was admixed with gelatin to give a blend containing about 80 percent by weight polymer and 20 percent by weight gelatin. The resulting mixture was spread in a thin film on the conductive tin oxide surface of a conductive glass plate electrode, and as the second electrode, a light-transmitting layer of gold was evaporated on the free surface of the polymer blend. The electrodes were connected to a source of D. C. current, and a potential in excess of 1.5 volts was applied across the cell whereupon the film changed color from yellow to blue in the vicinity of the cathode. After current flow was discontinued, the film cleared upon standing in air to its original color.

Since certain changes may be made in the above apparatus, product and process without departing from the scope of the invention herein involved, it is intended that all matter contained in the above description or shown in the accompanying drawings shall be interpreted as illustrative and not in a limiting sense.

What is claimed is:

1. A variable light-filtering device comprising a pair of spaced, parallel, coextensive light-transmitting electrodes, a layer of a light-transmitting, molecularly oriented redox polymer capable of forming a stable colored free radical upon the addition of electrons confined between said electrodes and means for flowing an electric current in a predetermined direction through said device.

2. A device according to claim 1 including a light-polarizing sheet substantially coextensive with and having one surface in juxtaposition with the outer surface of one of said electrodes.

3. A device according to claim 1 including means for reversing the direction of current flow.

4. A device according to claim 3 including means for automatically predetermining said direction of current flow.

5. A device according to claim 1 wherein said layer contains an oxidizing agent.

6. A device according to claim 1 wherein said polymer is capable of functioning as its own electrolyte.

7. A device according to claim 6 wherein said polymer is the sole electrolyte.

8. A device according to claim 1 wherein said polymer is poly-N,n-butylene-4,4'-dipyridylium dibromide.

* * * * *